United States Patent
Yuyama et al.

[11] Patent Number: 5,839,836
[45] Date of Patent: Nov. 24, 1998

[54] PRINTING APPARATUS FOR MEDICINE BAG

[75] Inventors: Shoji Yuyama; Keita Yasuoka; Sakae Tsuji; Hiroyasu Hamada, all of Toyonaka, Japan

[73] Assignee: Yuyama, Mfg. Co., Ltd., Toyonaka, Japan

[21] Appl. No.: 734,183

[22] Filed: Oct. 21, 1996

[30] Foreign Application Priority Data

Oct. 19, 1995 [JP] Japan ................................. 7-308103

[51] Int. Cl.⁶ ........................................................ B41J 5/30
[52] U.S. Cl. ................................ 400/62; 101/35; 400/76
[58] Field of Search ............................... 101/35; 400/76, 400/103, 104, 61, 62, 63; 395/115, 116

[56] References Cited

U.S. PATENT DOCUMENTS

| | | | |
|---|---|---|---|
| 4,994,968 | 2/1991 | Kato et al. ............................ | 400/76 |
| 5,452,094 | 9/1995 | Ebner et al. .......................... | 400/76 |

FOREIGN PATENT DOCUMENTS

| | | | |
|---|---|---|---|
| 60-129278 | 7/1985 | Japan ................................. | 400/103 |
| 3-35338 | 7/1991 | Japan . | |
| 7-10603 | 2/1995 | Japan . | |

*Primary Examiner*—Christopher A. Bennett
*Attorney, Agent, or Firm*—Wenderoth, Lind & Ponack, LLP

[57] ABSTRACT

A printing apparatus for medicine bags includes storage means having stored print data responsive to differences among individual drugs and patients. Reading means reads corresponding print data from the storage means based on prescription data. Printing means prints the print data read by the reading means on a medicine bag or the like in a specified format.

3 Claims, 18 Drawing Sheets

FIG. 5

Disease name file

| | Disease name | Depart-ment | Administration indicating information |
|---|---|---|---|
| Q98465 | Cold | Internal | This drug was prescribed for alleviating the syndrome of cold. |
| Q98466 | Cold | Internal | This drug was prescribed for alleviating headache. |
| Q98467 | Cold | Internal | This drug was prescribed for alleviating cough and pain on the throat. |
| Q98468 | Influenza | Internal | This drug was prescribed for alleviating fever and cough |
| Q98469 | Influenza | Internal | This drug is a prescription for alleviating gastrointestinal disorders and syndrome of influenza. |
| Q98470 | Influenza | Internal | This drug is a prescription for alleviating syndrome of influenza. |
| Q99001 | Measles | Internal | This drug is a prescription for reducing fever and alleviating syndrome of measles together with antibiotics. |

| Drug code | Administration time file |
|---|---|
| DA3564825 | Take this drug 10 to 30 minutes after meals. |
| DA3564826 | This drug is to be taken only once. Take when you feel a pain. |
| DA3564827 | Take this drug 10 to 30 minutes after meals. |
| DA3564828 | Take this drug 10 to 30 minutes after meals. |
| DA3564829 | Take this drug 10 to 30 minutes after meals. |
| DA3564830 | Take this drug 2 to 3 hours after meals. |
| DA3564831 | Take this drug 40 to 20 minutes before meals. |

FIG. 6

| Administration method file | |
|---|---|
| Drug code | Description of administration method information |
| DA3564825 | Don't open the capsule before taking this drug. |
| DA3564827 | Don't open the capsule before taking this drug. |
| DA3564828 | Crunch for taking this drug. |
| DA3564829 | Take this drug with a glass of water. |
| DA3564831 | Don't open the capsule before taking this drug. |
| DA3564833 | Take this drug with a glass of water. |
| DA3564836 | Take a capful of this drug and drink by diluting 10-fold with water. |

FIG. 7

DESCRIPTION OF DRUG AND CAUTIONS

IDuuuuuuuuuu
$$$$$$$$$$$$

Object &&&&&&&&&&&&&&&&&&&&&&&&&&
Administration %%%%%%%%%%%%%%%%%%%%%%%
method %%%%%%%%%%%%%%%%%%%%%%%
%%%%%%%%%%%%%%%%%%%%%%%
Description of drug
Example of Drug name   Side effect
appearance Report to doctor according to symptoms Address or phone for contact in emergency:
YUYAMA MEMORIAL HOSPITAL, Medication Consulting Room
0120-375-8989                                    000000uuuuu

FIG. 10

| # | Class. | X | Y | O | Control 1 | Control 2 | Control 3 | Item | Fixed printing/comment |
|---|---|---|---|---|---|---|---|---|---|
| 1 | H | 45 | 3 | 15 | #3 | | | 0000000 | Description of drug and cautions |
| 2 | H | 65 | 8 | 2 | | *3 | | 0000000 | ID |
| 3 | H | 68 | 8 | 15 | #3 | &3 | | 0945360 | Patient's ID number |
| 4 | H | 40 | 12 | 12 | #3 | | | 0945365 | Patient's name |
| 5 | H | 68 | 12 | 2 | #3 | | | 0000000 | Mr./Ms. |
| 6 | H | 8 | 18 | 8 | #3 | | | 0000000 | Object |
| 7 | H | 15 | 18 | 70 | #3 | | | 0945375 | Selection from disease name file |
| 8 | H | 8 | 24 | 8 | #3 | | | 0000000 | Administration method |
| 9 | H | 15 | 24 | 200 | #3 | &5 | | 0945677 | Selection from administration method file |
| 10 | H | 8 | 24 | 8 | | | | 0000000 | Usage |
| 11 | H | 15 | 24 | 200 | #3 | &5 | | 0945772 | Selection from usage file |
| 12 | H | 8 | 30 | 5 | 5 | | | 0000000 | Description of drug |
| 13 | H | 15 | 31 | 45 | 45 | | | 0000000 | Sample of appearance; drug name; side effect |
| 14 | H | 5 | 35 | 400 | #9 | | | 0945880 | Selection from drug file |
| 15 | H | 25 | 35 | 8 | #3 | &2 | | 0945881 | Selection from drug file |
| 16 | H | 33 | 35 | 18 | #3 | | | 0945882 | Selection from drug file |
| 17 | H | 8 | 42 | 15 | | | | 0000000 | Report to doctor according to symptoms |
| 18 | H | 8 | 43 | 200 | #3 | | | 0945883 | Selection from drug file |
| 19 | H | 8 | 46 | 50 | | &6 | | 0000000 | Contact us without hesitation when you noticed any symptoms. |
| 20 | H | 8 | 50 | 10 | | | | 0000000 | Address or phone for contact in emergency |
| 21 | H | 12 | 51 | 40 | | | | 0000000 | YUYAMA MEMORIAL HOSPITAL, Medication consulting room |
| 22 | H | 12 | 52 | 40 | | | | 0000000 | 0120-357-8989 Extension 264 |
| 23 | H | 50 | 53 | 3 | #5 | | | 0000000 | Pharmacist |
| 24 | H | 50 | 53 | 6 | #1 | *3 | | 0000000 | Yuyama |

FIG. II

Description of drug and cautions

Object: This drug was prescribed for alleviating the syndrome of cold.

Administration method:

Take this drug 10 to 30 minutes after meals.
    Take this drug with a glass of water.
    Don't open the capsule before taking this drug.
    <u>Don't drive a car or operate a machine</u> when you take antibiotics.

Description of drugs:

| Appearance | Drug name | Side effect |
|---|---|---|
|  | Anti-rhinitis agent: | May cause nasal congestion. |
|  | Antibiotics: | Eczema may develop in rare cases. This drug has a <u>sleep-inducing effect.</u> |
| 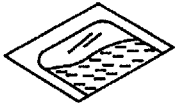 | Gastrointestinal drug: | Don't take together with <u>anti-headache drug.</u> |

REPORT TO DOCTOR ACCORDING TO SYMPTOMS

<u>When eczema develops over the whole body,</u>stop taking this drug and immediately consult the doctor in charge.

if you noticed some abnormality in syndrome, please contact us without hesitation.

Phone and address:
YUYAMA MEMORIAL HOSPITAL, Medication consulting room
0120-357-8989 Extension 264

Chemist: Yuyama

FIG. 13

Description of drug and cautions

Object: This drug was prescribed for alleviating the pain accompanying causative disease.

Usage; How to use:

With the pain still acute, take one more dose of this drug.

Allow 2 hours or more for taking the drug after that. Open the aluminum pack from the thinner end of this suppository. After applying to the anal for a while, insert sufficiently deep.

Dip the tip of this suppository for an easier insertion.

Your underwear may be dirtied because vegetable fats are used for the core of this drug. Don't worry because it is not due to your health condition.

Description of drugs

| Sample of appearance | Drug name | Side effects |
|---|---|---|
| 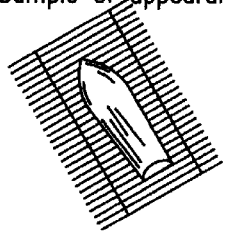 | Analgesic: | Gastrointestinal disorder such as diarrhea may occur. |

Report to doctor according to symptoms

Sometimes dyspepsia may occur. Consult the doctor if your syndrome is severe.

If you noticed some abnormality in syndrome, please contact us without hesitation.

Phone and address in emergency:

YUYMA MEMORIAL HOSPTIAL, Medication consulting room.

0120-357-8989 Extension 264

Chemist Yuyama

FIG. 14

<Description of drug>
Mr. Taro Yuyama
•Diuretics 01: This drug excretes urine and remits swelling.

•Antibiotic 02: This drug kills microorganisms.

FIG. 18

<Description of drug>
Ms. Hanako Yamada
•Diuretics 01: This drug excrete urine and reduce blood pressure.
•Antibiotics 02: This drug kills microorganisms. Inform the doctor in charge if you are in pregnancy (or breast-feeding), or have a possibility of pregnancy.

FIG. 19

<Discription of drugs>
Mr. Kazuo Kawabata
•Diuretics 01: This drug decreases intraocular-pressure, suppresses seizures of epilepsy, and remits apnea during a sleep. Don't take this drug when drinking because it may cause intensified dizziness when standing up.
•Antibiotics 02: This drug kills microorganisms.

FIG. 20

PRINTING APPARATUS FOR MEDICINE BAG

BACKGROUND OF THE INVENTION

The present invention relates to a printing apparatus for printing on medicine bags, and more particularly to a medicine-bag printing apparatus that allows administration data to be printed and moreover expressed in sentences corresponding to individual patients and drugs.

In the prior art, there has been a medicine-bag printing apparatus which is so devised as to print on medicine bags not only the patient name, hospital name and the like, but also the contents of the prescription, for the purposes of reducing the tasks of the pharmacy and allowing a clear discrimination of the medicine bags among the patients (for example, see Japanese Patent Publication HEI 7-10603).

In another medicine-bag printing apparatus, it is so arranged that the time and method of administration of drugs can be printed for patients' easier recognition (for example, see Japan Utility Model Publication HEI 3-35338).

In the former medicine-bag printing apparatus, however, its purpose is only to prevent the medicine bags from being mishandled to different patients, where it is difficult for the patient to understand the method of administration by reading the printed matter. In particular, when the patient receives many kinds of drugs, identification of each drug is so hard that he or she may misuse the drugs.

In the latter medicine-bag printing apparatus, the description is only such that the method of administration or the like is described uniformly for a drug, thus not always appropriate for the patient.

SUMMARY OF THE INVENTION

Accordingly, an object of the present invention is to provide a medicine-bag printing apparatus that allows medication instructional sentences or the like to be printed in detail and in appropriate expressions responsive to differences among disease names, drugs, and patients.

In order to achieve the above object, according to the present invention, there is provided a printing apparatus for medicine bags, comprising:

storage means for storing print data concerning drugs in units of drug identification data corresponding to the drugs, respective of the drugs;

reading means for reading pertinent print data from the storage means based on drug identification data included in prescription data; and printing means for printing the print data read by the reading means.

The drug identification data may be provided by drug codes attached to the drugs in one-to-one correspondence.

The printing means may print the print data read by the reading means, based on a drug code included in the prescription data, on a medicine bag at a preset position of specified coordinates.

Preferably, the print data includes side effect data. This allows the patient to clearly recognize that the drug may have a side effect since side effect data is printed on the medicine bag.

More preferably, the printing means prints with emphasis specified matters from the print data. This will make quite obvious specified matters concerning drugs, for example, important matters such as the contents of possible side effects and countermeasures therefor.

Also, in order to achieve the above object, according to the present invention, there is provided an apparatus for printing on medicine bags, comprising:

storage means for storing print data concerning drugs in correspondence to individual patient data in units of drug identification data corresponding to respective of the drugs, print data selecting means for selecting print data corresponding to a patient based on the patient data included in prescription data from the print data read by the reading means; and printing means for printing the print data selected by the print data selecting means.

Further, there is provided an apparatus for printing on medicine bags, comprising:

storage means for storing decision data composed of a decision classification name to which a decision classification code is attached, and a decision item name to which a decision item code is attached in correspondence to the decision classification code;

patient data composed of a patient code and a decision classification code/decision item code correlated to each patient code;

and drug data composed of a drug code attached to each drug, a decision classification code/decision item code correlated to each drug code, and a medication instruction sentence related to the decision classification code/decision item code;

printing means for printing print data, composed of the patient data and the drug data, on a medicine bag in a specified format;

medication instruction sentence selecting means for selecting a corresponding medication instruction sentence from the drug data based on the decision classification code/decision item code included in the patient data read by reading means;

print control means for printing the print data including the medication instruction sentence selected by the medication instruction sentence selecting means on the medicine bag in a specified format by the printing means.

Preferably, the storage means has a medication instruction sentence which does not correspond to the decision classification codes/decision item codes as the drug data, and the medication instruction sentence selecting means selects the medication instruction sentence when the drug code read by the reading means has no coincident decision classification code/decision item code included in the patient code.

In addition, a sheet of paper to be enclosed in the medicine bag may be used as a print medium instead of the medicine bag.

BRIEF DESCRIPTION OF THE DRAWINGS

FIG. 5 is a view showing the storage contents of a disease name file;

FIG. 6 is a view showing the storage contents of an administration time file;

FIG. 7 is a view showing the storage contents of an administration method file;

FIG. 10 is a view showing a print image displayed on an upper part of a display screen;

FIG. 11 is a view showing a display input screen for preparing the print image of FIG. 10;

FIG. 13 is a view showing an example of cautions printed by the medicine-bag printing apparatus of FIG. 1;

FIG. 14 is a view showing another example of cautions printed by the medicine-bag printing apparatus of FIG. 1;

FIG. 18 is a front view of a caution label showing an example of printing results;

FIG. 19 is a front view of a caution label showing another example of printing results; and FIG. 20 is a front view of a caution label showing yet another example of printing results.

DETAILED DESCRIPTION OF THE PREFERRED EMBODIMENT

Embodiments of the present invention are described below with reference to the accompanying drawings.

(First Embodiment)

Figure 1:
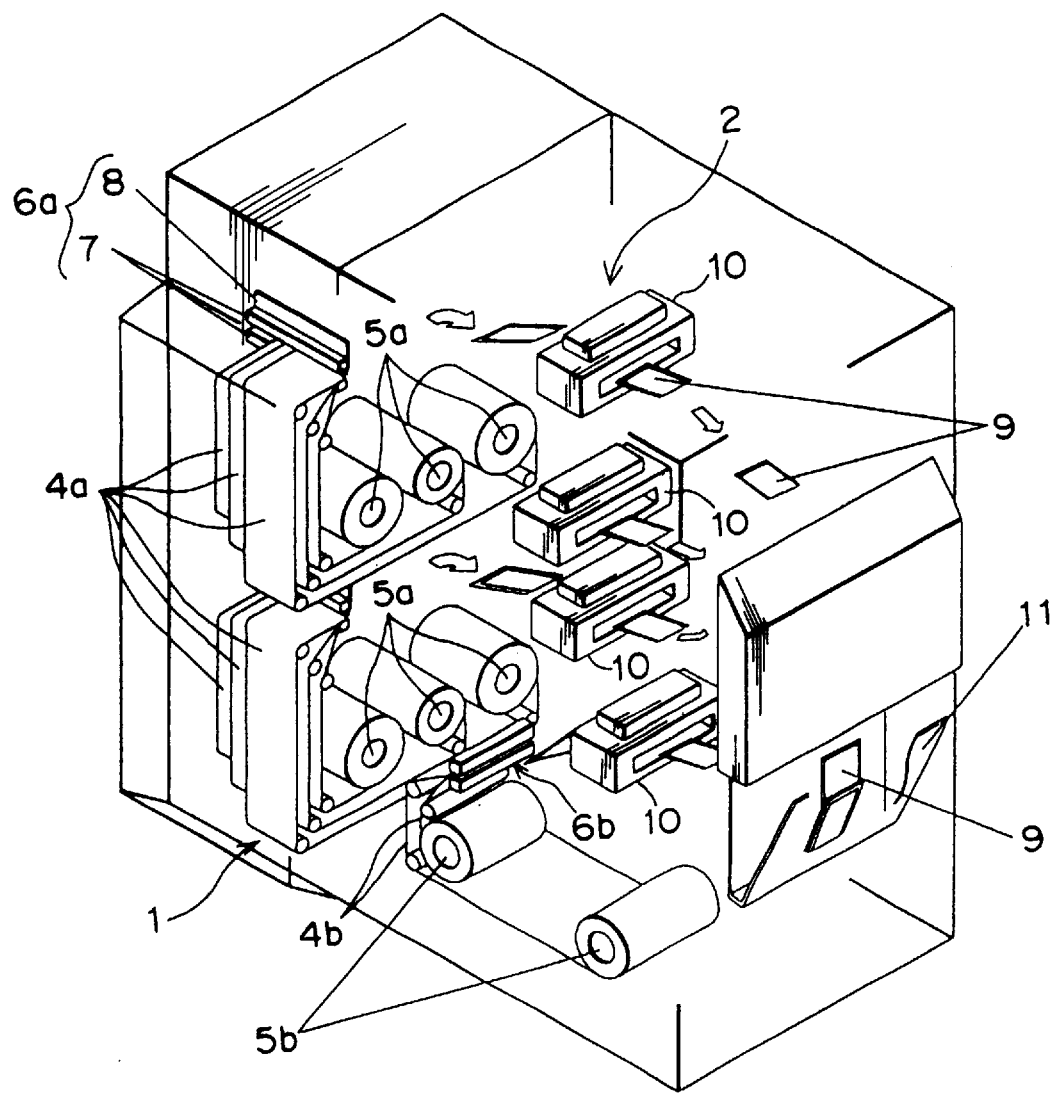
FIG. 1 is a perspective view of the medicine-bag printing apparatus according to a first embodiment of the invention.
Figure 2:
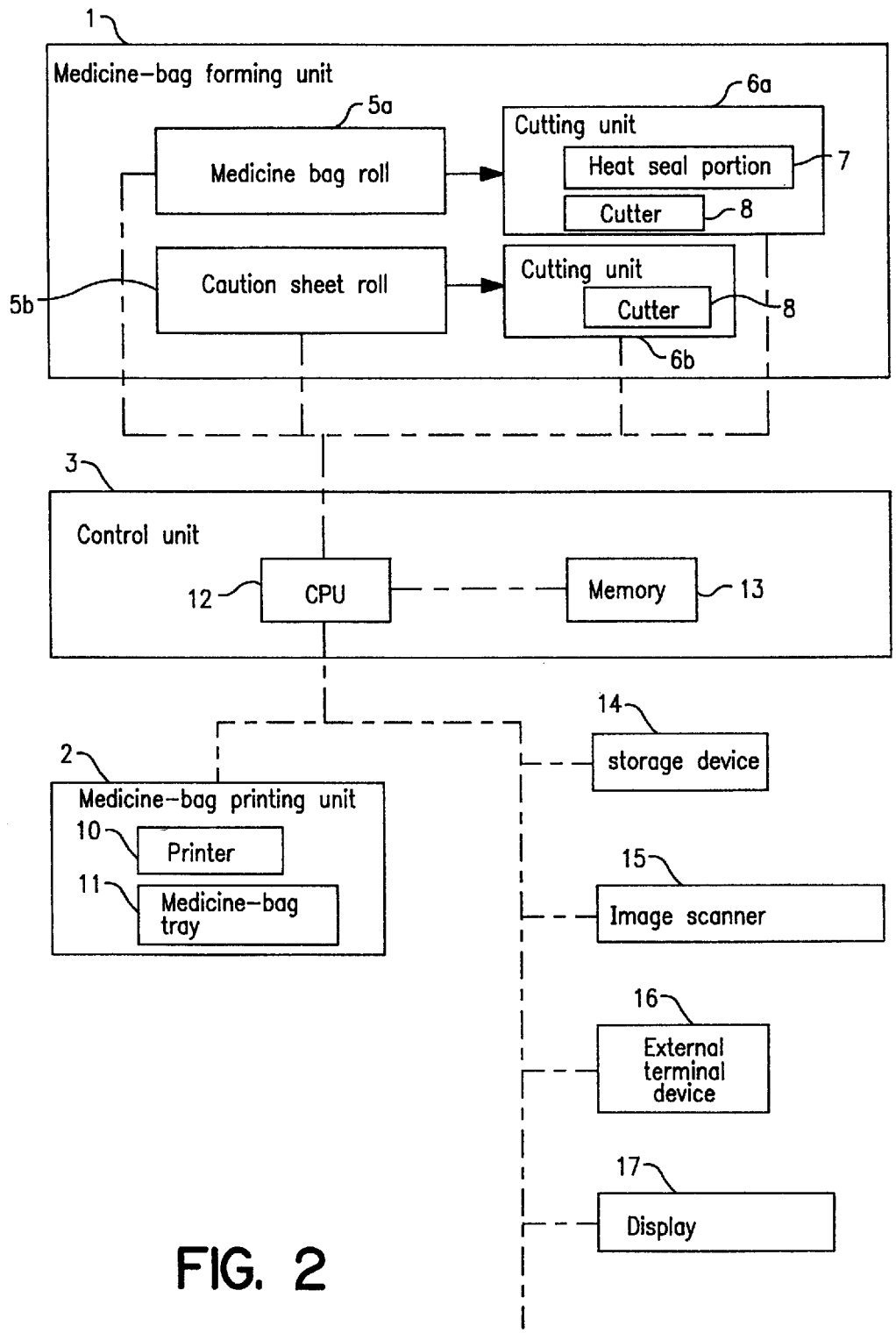
FIG. 2 is a block diagram of the medicine-bag printing apparatus according to the first embodiment of the invention.

The medicine-bag printing apparatus according to a first embodiment, as shown in FIGS. 1 and 2, generally comprises a medicine-bag forming unit 1, a medicine-bag printing unit 2 and a control unit 3.

Figure 3A:
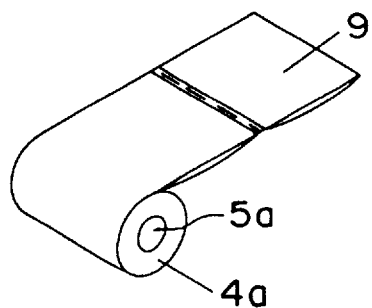
FIG. 3A is a perspective view of a medicine-bag sheet wound around a roll used in the medicine-bag printing apparatus of FIG. 1.
Figure 3B:
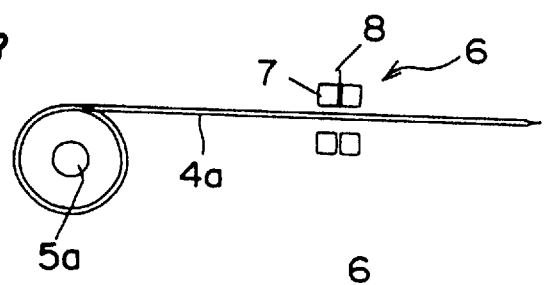
FIG. 3B is a front view showing a state immediately after sealing the bag.
Figure 3C:
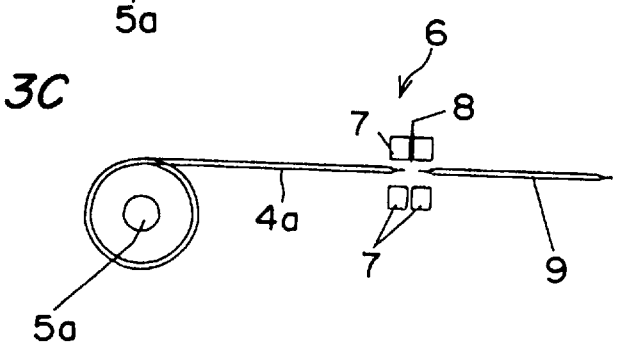
FIG. 3C is a front view showing a state after cutting off the bag.

The medicine-bag forming unit 1 comprises: rolls 5a which are juxtaposed at three places each above and below and around which is wound a medicine-bag sheet 4a folded in two longitudinally and having a width different from each other; rolls 5b which are juxtaposed at two places below and around which a caution sheet 4B is wound; a cutting unit 6a for cutting off the medicine-bag sheet 4a unwound from the rolls 5a, 5b; and a cutting unit 6b for cutting off the caution sheet 4B. The medicine-bag sheet 4a has a laminate film adhesively applied on one side on which the medicine-bag sheet 4a is to be folded up. The cutting unit 6a comprises heat seal portions 7 and a cutter 8 interposed there between. The heat seal portions 7, as shown in FIGS. 3A to 3C, pinch and heat the medicine-bag sheet 4a, thereby fusing the laminate film, so that the medicine-bag sheet 4a is laminated together at a specified width. The cutter 8, which is disposed at the middle of the heat seal portions 7, cuts off the laminated medicine-bag sheet 4a, by which a medicine bag 9 is completed. The feed pitch of the medicine-bag sheet 4a is automatically changed responsive to differences in the size of the bag. The cutting unit 6b is composed of only the cutter 8.

The medicine-bag printing unit 2 consists of a plurality of printers 10. The printers 10 may be adopted from a variety of printers such as ink jet and thermal transfer printers, where various printing methods in addition to the character printing are possible such as graphic printing that directly shows the appearance of drugs read by an image scanner 15, which will be described below, color printing, and braille printing for blind persons. Printing lay-out and the like can be changed, while font change, highlighted display and the like are possible in the character printing. In addition, the medicine bag 9 printed at the medicine-bag printing unit 2 is discharged onto a medicine-bag tray 11.

The control unit 3, as shown in FIG. 2, comprises a central processing unit (CPU) 12, memory 13, and the like. To the control unit 3 are connected a storage device 14, an image scanner 15, external terminal device 16, a display 17 and the like as well as the medicine-bag printing unit 2.

In the storage device 14 are stored drug data, print data and the like.

Figure 4:
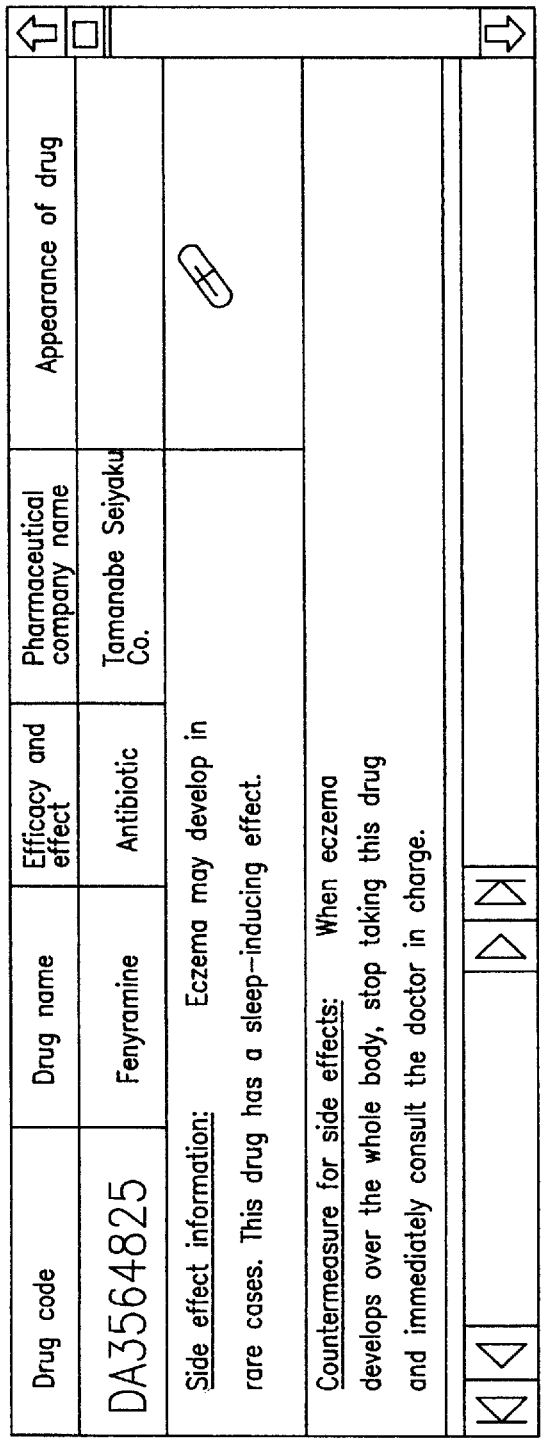
FIG. 4 is a view showing the storage contents of a drug file.

The drug data is stored in drug files. As shown in FIG. 4, the contents to be stored in the drug files are those of the drug name, efficacy and effect, the pharmaceutical company name, appearance of the drug, side effects, countermeasures for the side effects, and the like (the contents of the efficacy and effect, appearance of drug, side effects and countermeasures for the side effects also correspond to the print data that will be described later). The efficacy and effect of a drug refers to a generic name of particular drugs, such as gastrointestinal drugs, intestine controlling drugs, antipyretic drugs, and antitussive drugs, a name that allows the patients to understand the efficacy and effect of the drug. The appearance of a drug is image data (which may be either colored or black-and-white) read by the image scanner 15. The side effect information concerns possible side effects and may be provided, for example, in three-step expressions of "a symptom that does not need to be immediately reported to a doctor", "a symptom that should be immediately reported to a doctor", and "a symptom that should be followed by immediately going to hospital", so that the patient can decide his or her side effect symptoms stepwise. This side effect information also contains synergic side effects among drugs as well as symptoms unique to the patient.

When a network is constructed among medical institutions and the like, the drug data may be stored in a database of a host computer or other storage devices or the like. This database is, preferably, updated to a new one in response to input data of new drugs entered from other external terminal devices or the like.

The print data are stored in a disease name file, an administration time file, an administration method file, a usage file, a caution information file and a printing format file in addition to the aforementioned drug file. The descriptions in the files other than the disease name file are provided in one-to-one correspondence to drug codes which is the drug discrimination information so that the drug code will not overlap in the same file.

The contents to be stored in the disease name file, as shown in FIG. 5, are those concerning the disease name code, disease name, distinction among clinical departments and administration indicating information. The aforementioned administration indicating information refers to reasons for prescription of prescribed drugs. This is purposed to show the patient the reason for the prescription corresponding to his or her symptom, on the ground that even with the same disease name, the symptoms differs among individual patients and therefore the kinds of drugs to be prescribed differ among them. For example, even when the disease name is cold identically between patients, the drugs to be prescribed as well as the reason for the prescription differ between a patient showing the symptom of only cough and another patient showing only headache, in which case different disease name codes would be selected for the patients. This disease name code is selected from the disease name file by the external terminal device 16 in the preparation of the clinical chart by the doctor, thus forming part of the prescription data.

The contents to be stored in the administration time file, as shown in FIG. 6, are those concerning the drug code and the time at which the drugs corresponding to the drug codes are administered. The administration time is expressed in more appropriate and kind expressions for the patient, like "Take about 10 to 30 minutes after every meal", rather than in conventional unclear expressions like "Before meals", or "After meals".

The contents to be stored in the administration method file, as shown in FIG. 7, are those concerning the drug code and the actual administration method for the drugs, especially internal medicines like tablets, corresponding to the drug codes.

Figure 8:
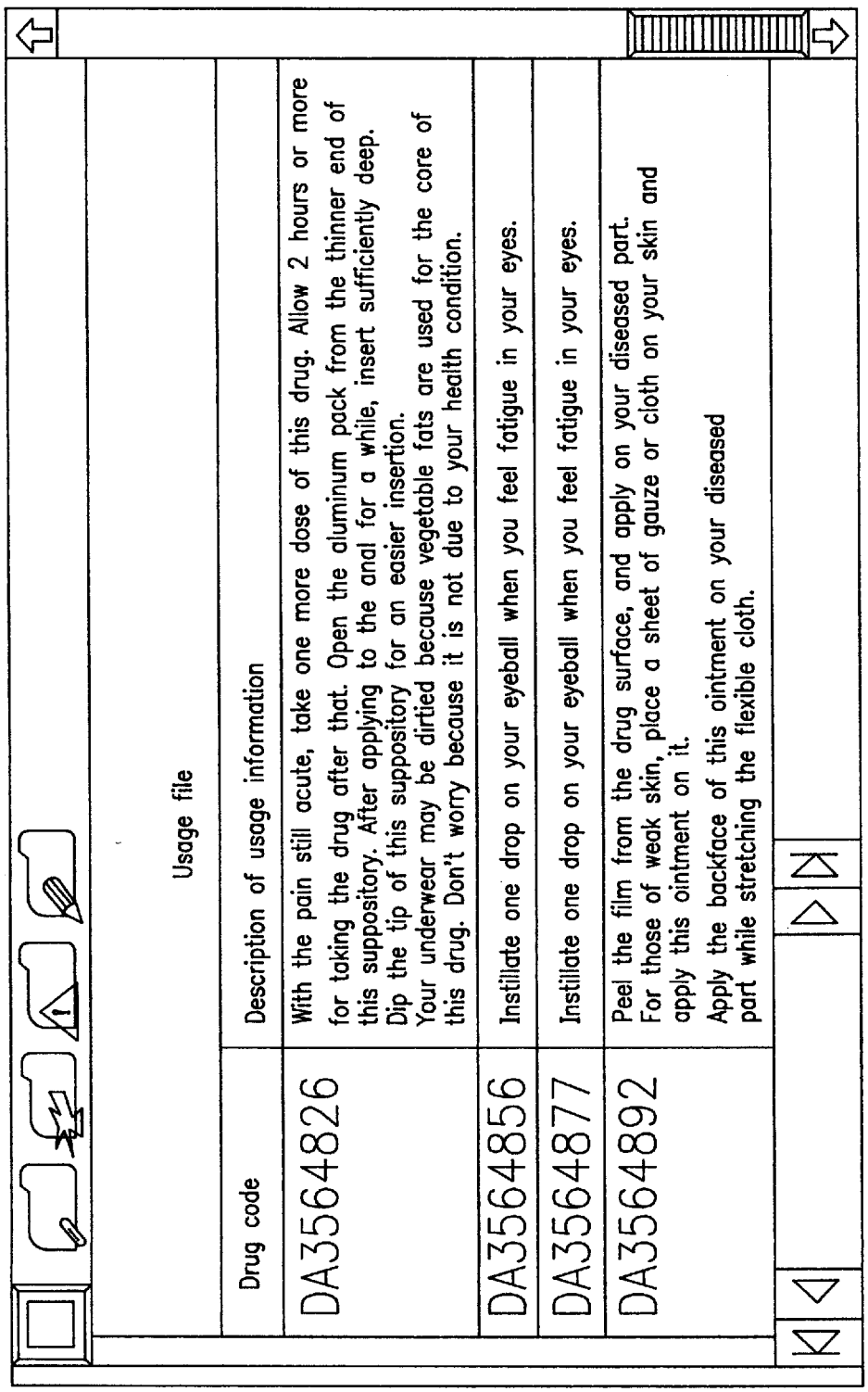
FIG. 8 is a view showing the storage contents of a usage file.

The contents to be stored in the usage file, as shown in FIG. 8, are those concerning the drug code and the actual method of use for the drugs, especially external medicines like stupes or eye drugs, corresponding to the drug codes.

Figure 9:
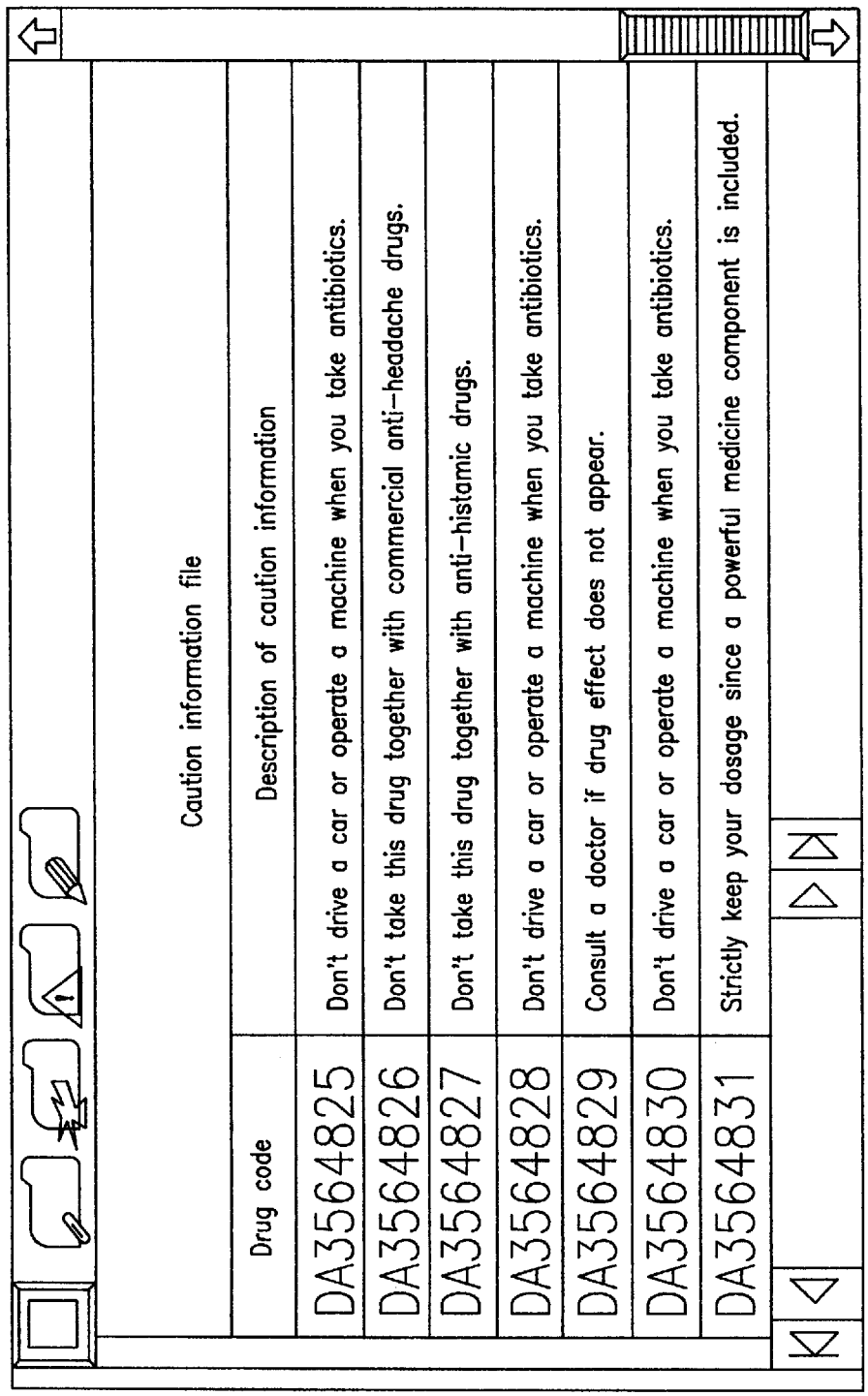
FIG. 9 is a view showing the storage contents of a caution information file.

The contents to be stored in the caution information file, as shown in FIG. 9, are those concerning the drug code and cautions for the drugs corresponding to the drug codes. The cautions refer to the statement for recommending cautions against disorders that could be predicted to arise from side effects. This statement is concrete and easy for the patient to understand like, for example, "Don't drive a car or operate a machine when you take antibiotics."

The above-mentioned administration method, usage and caution information are of the contents which would conventionally be orally given at the time of handing over the drugs to the patient at the pharmacy and which have been formed into character data for printing on the medicine bag 9.

The contents to be stored in the print format file are those concerning the format for printing on the medicine bag 9. The print image to be displayed on the upper part of the display 17 is displayed as shown in FIG. 10, and the list items to be displayed on the lower part of the display 17 can be stored as shown in FIG. 11. The list items, which are to determine the print image to be displayed on the upper part of the display 17, include coordinates (X, Y) indicating the start point of printing, the number of characters (O), color (control 1), font (control 2), size (control 3), print items, printing contents and the like. The print items are accompanied by identification numbers for discriminating print data to be read from the aforementioned files. Then, based on these identification numbers, specified print data are read from the corresponding files, as will be described later. Among the print items, "@@ . . . " shows fixed print contents, such as a title ("Description of drugs and cautions") presented on its right field.

Each of the items in FIG. 11 is described below (printed results are as shown in FIG. 13).

The first row has the contents that the item is "@@ . . . ", and that the print data in the column of fixed printing/ comment, "Descriptions of the drug and cautions", is printed at the position of the coordinates (X, Y)=(45, 3) with the number of characters O=15 in the characters of control 1 (character color)=#3 (black) and control 3 (character size) =*1.

The rows 2, 5, 6, 8, 10, 12, 13, 17, 19, 20, 21, 22, 23 and 24 show the contents, in every case, that the item is "@@ . . . " and that the print data in the column of fixed printing/comment, "ID", "Mr./Ms.", "Object", "Administration method", "Usage", "Description of drugs", "Sample of appearance; drug name; side effects", "Report to doctor according to symptoms", "Contact us without hesitation when you noticed any symptoms", "Address or phone for contact in emergency", "Drug consulting room of Yuyama Memorial Hospital", telephone number "0120-357-8989, Extension 264" and pharmacist in charge "Yuyama" are printed, respectively, in a specified format as in the first row described above.

The 3rd row has the contents that the item is an item number, "0943360", and that this item number is correlated with the patient's ID number in the prescription data and taken as the print data. Then, according to these contents, a patient's ID number corresponding to transmitted prescription data is incorporated as print data and can be printed at a position of coordinates (X, Y)=(68, 8) in the characters of the number of characters O=15 and control 1=#3.

The 4th row has the contents that the item number is "0945365", and that this item number is correlated with the patient's name of the prescription data and taken as the print data. It is to be noted that the printing method by these contents is similar to that of the 3rd item described above.

The 7th row has the contents that the item number is "0945375" and that this item number is correlated with the prescription data and a disease name code, "Q98465", of the disease name file, and further that, upon an input of prescription data having this disease name code, the corresponding print data, "This drug is prescribed for relieving symptoms of cold", is selected from the disease name file and printed in the same format as described previously.

The 9th row has an item number, "0945677"; the 11th row has an item number, "0945772"; the 14th row has an item number, "0945880"; the 15th row has an item number, "0945881"; the 16th row has an item number, "0945882"; and the 18th row has an item number, "0945883". Each of these rows is correlated with the prescription data and a drug code, "DA3564825", of the individual files. Then, upon an input of prescription data having this drug code, the corresponding print data are selected from the individual files and printed in the same format as described previously. In the case of the 9th row, print data, "Don't open the capsule before taking this drug", is selected from the administration method file. In the case of the 11th row, print data is not selected since the above drug code is not included in the usage file. In the cases of the 14th, 15th, 16th and 18th rows, image data showing the appearance of the drug, "Drug name (efficacy and effect): Anti-rhinitis agent", "Side effects: May cause nasal congestion; When eczema develops over the whole body, stop taking this drug and immediately consult the doctor in charge" are selected from the drug file. The term, "#9", in the 14th row indicates that illustration-treated data is displayed in full color; the term, "&2", of the 15th row indicates that the characters are double sized and underlined; the term, "&6", of the 23th row indicates that a double underline is attached to the character; and the term, "*3", of the 24th row indicates that the characters are encircled.

The above description has been made on internal medicines. In the case of external medicines, the print data would be selected not in the 9th row but in the 11th item from the usage file.

The image scanner 15 is used to capture the appearance of the drug as image data. A CCD camera or the like may be used instead of the image scanner 15.

The external terminal device 16 is equipped in the consulting room and used for input of the prescription data by doctors. The prescription data include the disease name data selected from the disease name file described above and, besides, prescription data on the drug to be prescribed, the patient's name and the patient's ID number, and patient data on the intrinsic side effects of the patient.

The print image, list items, current print contents, error information, instruction information and the like are displayed on the display 17.

Figure 12:
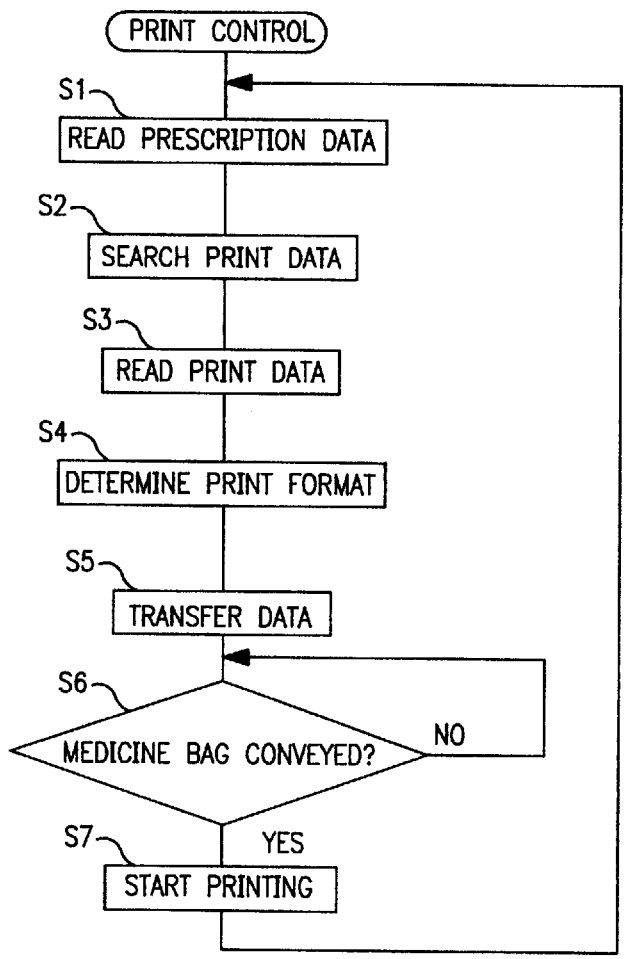
FIG. 12 is a flow chart showing a print control operation.

Next, the print control operation by the control unit 3 is described below with reference to the flow chart of FIG. 12.

First, prescription data is read into the memory 13 (step S1). The prescription data to be read includes, as described above, the disease name code, the patient code and the like entered by doctors and pharmacists or the like in correspondence to each patient from the external terminal device 16, as well as the patient code and the drug code to be prescribed. The prescription data are written into the storage device 14 upon each input, so that the storage contents are updated.

Next, the corresponding print data are retrieved according to the read prescription data (step S2), and read into the memory 13 (step S3). In more detail, the print data (descriptions) having one-to-one correspondence with the disease name code and the drug code are read from the files described above according to the disease name code and drug code included in the prescription data. For example, when a disease name code, "Q98465", and a drug name code, "DA3564825", are included in the prescription data, the print data, "This drug is prescribed for relieving symptoms of cold", is read from the disease name code. An efficacy and effect of the drug, "antibiotic", the appearance of drug, side effect information, and countermeasure for side effects are also read from the drug file. The corresponding print data are also read from the administration time file, the administration method file and the like in the same way.

Then, after the print format according to the actual contents of the read print data is determined (step S4), this print format and print data are transferred to the medicine-bag printing unit 2 (step S5). Since predetermined patterns have been prepared for the print format in correspondence to the print data to be read, a suitable format is selected depending on which file the print data is read from. The print format can be easily set by changing, on the screen of the display 17, the coordinates (X, Y) indicating the printing start point, the number of character (O), color (control 1), font (control 2), size (control 3), print items and print contents. In this case, the print format may be freely selectable or changeable by operators on the display 17 of the terminals.

The medicine-bag printing unit 2 decides whether or not the medicine bag 9 has been transferred (step S6), where if it has, the printing process is started according to the transferred data (step S7).

The printed contents are so detailed, as shown in the caution sheets in FIGS. 13 and 14, that patients are unlikely to misunderstand them in taking the drug. In particular, the kinds of drugs are easy to discriminate because of color graphic printing showing the appearance of the drug. Moreover, because the object of taking the drug is printed, the patient is allowed to recognize which symptom is relieved or cured by taking the drug. Therefore, when the patient consults with a doctor, for example, because he has not experienced any remission by taking the drug, he or she is allowed to specifically determine its reason so that a rapid and appropriate reply can be obtained.

Although printing is made on the caution sheet to be enclosed in the medicine bag 9 in the above-described first embodiment, it may also be done directly on the medicine bag 9.

Further, the medicine bag 9 or the caution sheet is formed by unwinding the medicine-bag sheet 4a or the caution sheet 4b from the rolls 5a, 5b in the first embodiment. However, it is also possible that the bags or sheets previously completed into a predetermined shape are accommodated into stockers 21 disposed in a plurality of stages (5 stages) in the vertical direction as shown in the medicine-bag printing apparatus of FIG. 15. According to this medicine-bag printing apparatus, the medicine bags and the like discharged from each stocker 21 are transferred to a printer 23 via transfer means 22, and after specified printing operations, discharged onto a tray 24. The transfer means 22 comprises an inlet path 25 and a transfer member 26. The inlet path 25 is composed of two fixed inlet paths 25a corresponding to the upper first- and second-stage stockers 21, two fixed inlet paths 25b corresponding to the lower fourth- and fifth-stage stockers 21 and a movable inlet path 25c corresponding to the middle third-stage stocker 21. The transfer member 26 is provided two, in upper and lower two stages, where the upper-stage transfer member 26 feeds the printer 23 with the medicine bag 9 introduced from either the upper two fixed inlet paths 25a or the movable inlet path 25c, and the lower-stage transfer member 26 feeds the printer 23 with the medicine bag 9 introduced from either the lower fixed inlet paths 25b or the movable inlet path 25c. The medicine bag and the like to be accommodated in the third- and fourth-stage stockers 22, as counted from the top, are fed to either the upper or the lower printer 23, whichever is selected by a switching member.

Further, in the first embodiment, drug codes are attached to the individual drugs and the corresponding print data are selected from the individual files. Otherwise, the print data may be correlated with the individual files by means of other characters, such as keywords, or symbols, instead of the drug codes.

(Second Embodiment)

Figure 15:
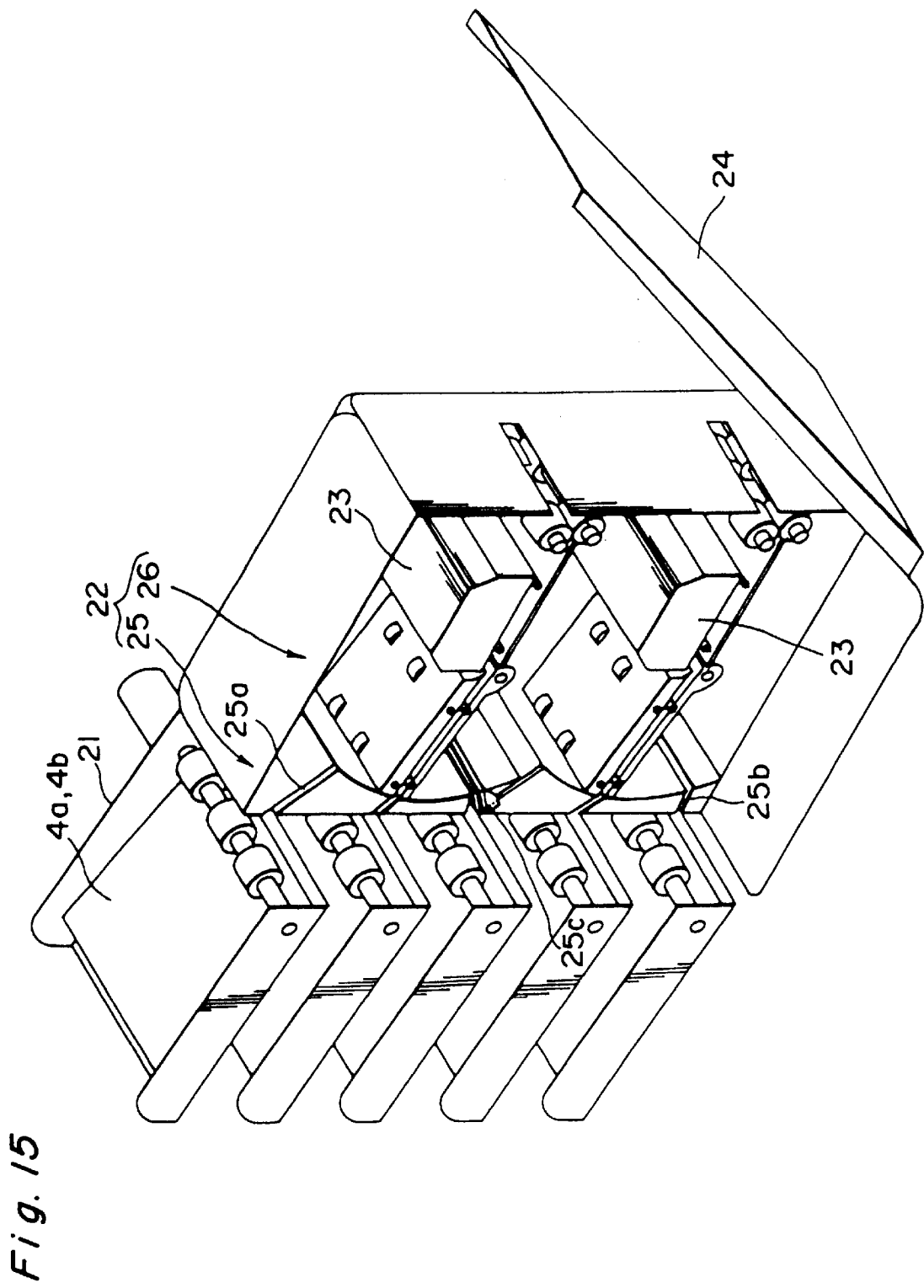
FIG. 15 is a perspective view schematically showing another printing apparatus for printing on medicine bags.

The medicine-bag printing apparatus according to a second embodiment of the invention, in which the same hardware as that of the first embodiment is used, is described with reference to FIGS. 1 and 2. This second embodiment is applicable to the medicine-bag printing apparatus of the type as shown in FIG. 15.

Decision data, drug data and patient data are stored in the storage device 14.

The decision data is data for deciding which medication instruction sentence among a plurality of medication instruction sentences should be printed on the medicine bag. The decision data includes, as shown in Table 1, decision classification names to which respective decision classification code are attached, and data indicating whether or not a decision item is contained in this decision classification name.

TABLE 1

| Decision classification code | Decision classification name | Whether decision item code is present |
|---|---|---|
| 00001 | Nationality/Language | YES |
| 00002 | Age | NO |
| 00003 | Sex | YES |
| 00004 | Department | YES |
| 00005 | Disease name / Efficacy and effect | YES |
| 00006 | Notification of disease name | YES |
| 00007 | Medication instruction | YES |
| 00008 | Sight failure | YES |
| 00009 | Audition failure | YES |
| 00010 | Drinking | YES |
| 00011 | Smoking | YES |
| 00012 | Allergy | YES |
| 02001 | Doctor | YES |

Further, in correspondence to the decision classification codes, decision item names with corresponding decision item codes attached thereto are stored as shown in Table 2.

TABLE 2

| Decision classification code | Decision item code | Decision item name |
|---|---|---|
| 00001 | 001 | Japan |
| 00001 | 002 | English area |
| 00001 | 003 | Hankul area |
| 00001 | 004 | Taiwan |
| 00003 | M | Male |
| 00003 | F | Female |
| 00004 | 01 | Internal department |
| 00004 | 02 | Surgical department |
| 00004 | 03 | Pediatrics department |
| 00004 | 04 | Obstetrics and gynecology department |
| 00005 | 001 | Cardiac disease |
| 00005 | 002 | Cancer |
| 00005 | 003 | Diuretic effect |
| 00005 | 004 | Blood-pressure drop effect |
| 00005 | 005 | Intraocular-pressure reducing effect |
| 00005 | 006 | Epilepsy |
| 00005 | 007 | Apnea during a sleep by respiratory acidosis |
| 00006 | 1 | Notification of disease name: YES |
| 00007 | 1 | Medication instruction: YES |
| 00008 | 1 | Sight failure: YES |
| 00009 | 1 | Audition failure: YES |
| 00010 | 1 | Drinking: YES |
| 00011 | 1 | Smoking: YES |
| 00012 | 1001 | Food allergy: YES |
|  | 2001 | Drug allergy: YES |
| 02001 | 0101 | Satoru Aikawa |
|  | 0102 | Naoto Ishida |
|  | 0201 | Naomi Uetani |
|  | 0202 | Yoshiko Emoto |

The drug data is composed roughly of a drug master and a medication instruction master. Drugs such as diuretics, antibiotics, . . . are stored in the drug master and, as shown in Table 3, drug codes are attached to the respective drugs. In the medication instruction master, a plurality of medication instruction sentences are stored for each drug.

TABLE 3

| Drug code | Medication instruction sentence | Decision classification code | Decision item code | Comparison condition | Logical continuation condition | Efficacy and effect | Default |
|---|---|---|---|---|---|---|---|
| 231001 Diuretics | This drug excretes urine and remits swelling. |  |  |  |  | ○ | ○ |
|  | This drug excretes urine and decreases blood pressure. | 00005 Disease name/ Drug efficacy | 03 Diuretic effect | = | AND | ○ |  |
|  |  | 00005 Disease name/ Drug efficacy | 04 Blood pressure reducing effect | = |  |  |  |
|  | This drug suppresses seizures of epilepsy and remits apnea during a sleep. | 00005 Disease name/ Efficacy of drug | 05 Intraocular pressure decreasing effect | = | OR | ○ |  |
|  |  | 00005 Disease name/ Efficacy of drug | 06 Epilepsy | = | OR |  |  |
|  |  | 00005 Disease name/ Efficacy of drug | 07 Apnea during a sleep by respiratory acidosis | = |  |  |  |
|  | Don't take this drug when drinking because it may cause | 00010 Drinking | 1 Drinks | = |  |  |  |

TABLE 3-continued

| Drug code | Medication instruction sentence | Decision classification code | Decision item code | Comparison condition | Logical continuation condition | Efficacy and effect | Default |
|---|---|---|---|---|---|---|---|
| | intensified dizziness when standing up. Inform the doctor in charge if you are in pregnancy (or breastfeeding), or have a possibility of pregnancy | 00003 Sex | F | = | AND | | |
| | | 00002 Age | 10 (age) | ≧ | AND | | |
| | | 00002 Age | 50 (age) | ≦ | | | |
| | | 00005 Disease name/ Efficacy of drug | 04 Blood-pressure decreasing effect | = | | | |
| | | 00005 Disease name/ Efficacy of drug | 06 Epilepsy | = | OR | | |

The medication instruction sentences can be divided into those concerning efficacy and effect and those concerning caution for administration. As for diuretics, for example, such expressions concerning the efficacy and effect as "This drug excretes urine and remits swelling" or "This drug excretes urine and decreases blood pressure", and the expression concerning caution that "Don't take this drug when drinking because it may cause intensified dizziness when standing up" are stored. Also, for each medication instruction sentence, which medication instruction sentence is selected, can be determined depending on the decision classification code/decision item code, the comparison condition, the logical continuation condition, or whether or not the efficacy/effect are appropriate, or whether or not the default is appropriate.

The decision classification code includes "Disease name/ efficacy and effect", "Age", "Sex", etc. set from those shown in Table 1. The decision item code is set from those shown in Table 2, including those corresponding to the efficacy and effect of drugs such as "diuretic effect" and those corresponding to caution such as "drinks". These decision classification codes and decision item codes are used for deciding whether or not a medication instruction sentence listed in the left column of Table 3 is selected.

The comparison conditions include "=", "≠", ">", "<", "≧" and "≦". The comparison conditions "=" and "≠" are used when the decision classification code includes a decision item code, where it is decided whether or not the decision classification code and decision item code of a patient code, which will be described later, coincide with the decision classification code and decision item code in the left column of this comparison condition. For example, in the medication instruction sentence, "This drug excretes urine and decreases blood pressure", if the decision item code is "diuretic effect", then the comparison condition data is "=". In this case, it is decided whether or not the decision classification code and decision item code included in the patient data coincide with the decision classification code and decision item code corresponding to diuretic effect, where if it does, the medication instruction sentence is selected. As for the comparison conditions of ">", "<", "≧" and "≦", when the decision classification code has no decision item code but is shown in numerical value, it is decided whether the numerical value of the decision item code in the patient code, which will be described later, is larger or smaller than the numerical value of the decision item code in the left column of the pertinent comparison condition.

The logical continuation conditions are "AND" or "OR". If there are a plurality of decision classification codes/ decision item codes corresponding to a medication instruction sentence and if the logical continuation condition is "AND", then the medication instruction sentence is selected under the condition that all the decision classification codes/ decision item codes are included in the patient data. If the logical continuation condition is "OR", then the medication instruction sentence is selected when any one of the decision classification codes/decision item codes is included in the patient data.

The efficacy/effect shows whether or not the medication instruction sentence has the contents showing any efficacy/ effect, where otherwise the medication instruction sentence corresponds to the caution for use.

The default corresponds to the medication instruction sentence that is to be selected when none of the decision classification codes/decision item codes included in the patient data described later satisfies any one of the comparison conditions.

The patient data, as shown in Table 4, is data in which decision classification codes/decision item codes are stored for individual patients and are updated, as required, by input operations of chemists or the like. These decision classification codes/decision item codes are the same as those of the aforementioned decision data.

TABLE 4

| Patient code | Decision classification code | Decision item code |
|---|---|---|
| 1995000001 Taro Yuyama | 00001 Nationality/Language area | 001 Japan |
| | 00003 Sex | M Male |
| 1995000002 Hanako Yamada | 00003 Sex | F Female |
| | 00004 Age | 23 (age) |

TABLE 4-continued

| Patient code | Decision classification code | Decision item code |
|---|---|---|
| | 00005<br>Disease name/Efficacy of drug | 03<br>Diuretic effect |
| | 00005<br>Disease name/Efficacy of drug | 04<br>Blood pressure decreasing effect |
| 1995000003<br>Kazuo Kawabata | 00005<br>Disease name/Efficacy of drug | 06<br>Epilepsy |
| | 00010<br>Drinking | 1<br>Drinks |

Figure 16:
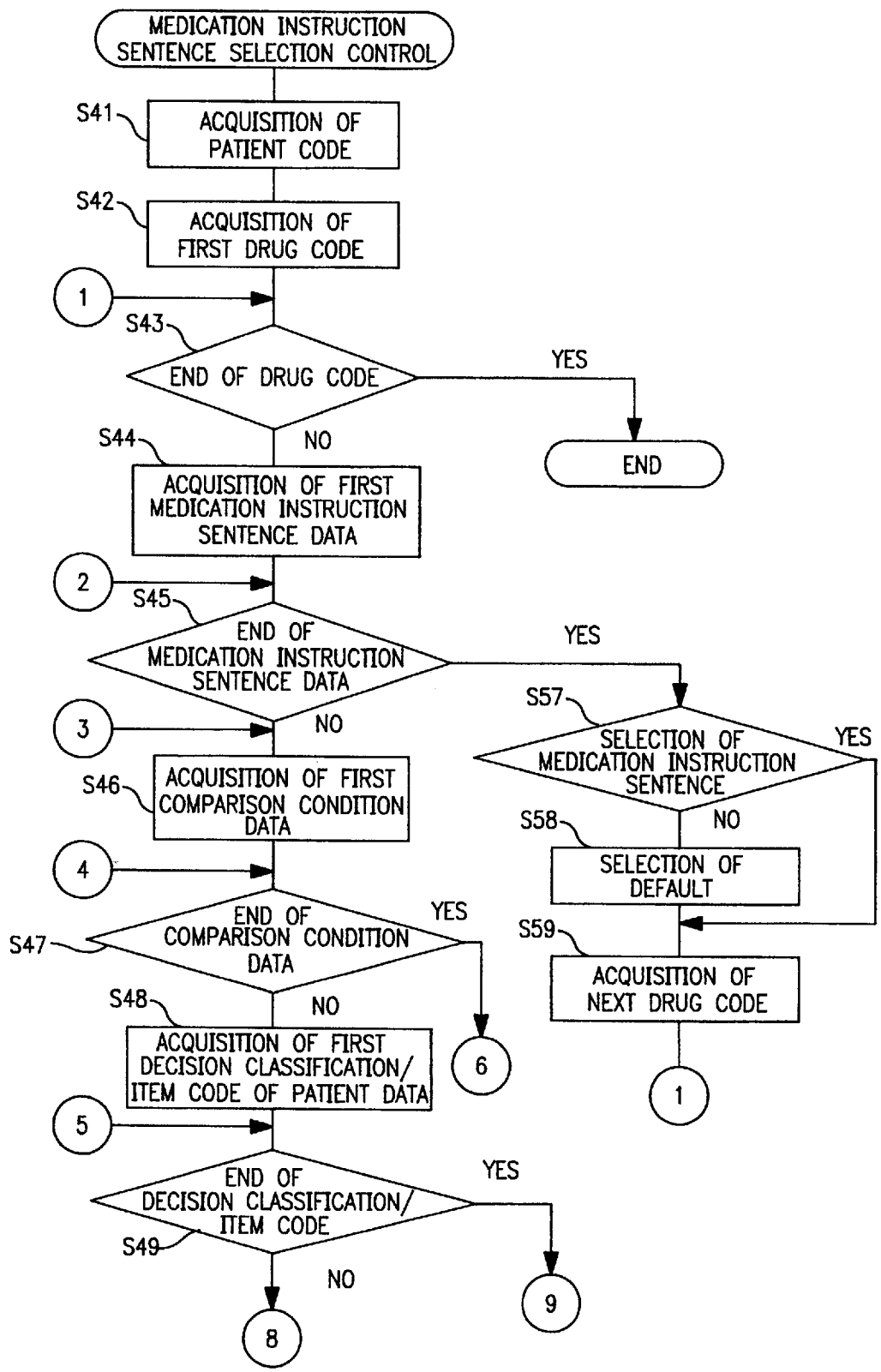
FIG. 16 is a flow chart showing a medication instruction sentence selection control operation according to a second embodiment.
Figure 17:
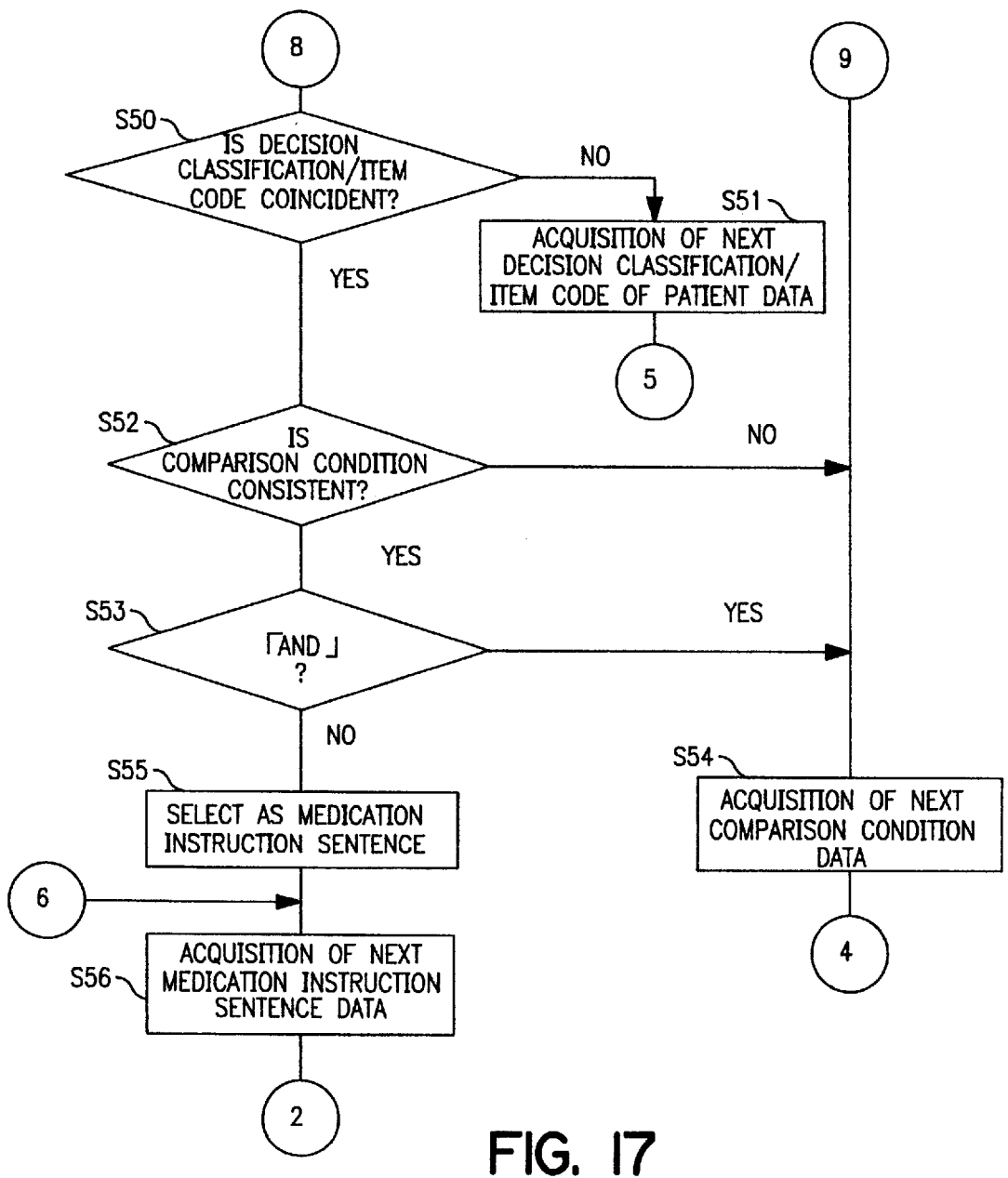
FIG. 17 is a further flow chart showing the medication instruction sentence selection control operation according to the second embodiment.

Next, the medication instruction sentence selection control operation control to be performed by a control unit 25 is described with reference to the flow charts of FIGS. 16 and 17.

First, based on input of prescription data, patient data corresponding to the patient code in the prescription data, as well as drug data corresponding the first drug code, are acquired from the storage device 14 (steps S41, S42)

Next, the first medication instruction sentence data corresponding to the first drug code is acquired from the medication instruction sentence master (step S44). This acquisition of the medication instruction sentence is carried out on all the medication instruction sentences of the drug data included in the aforementioned prescription data (step S43).

Subsequently, the first comparison condition data is acquired from the acquired medication instruction sentence data (step S46). This acquisition of the comparison condition data is carried out on all the comparison condition data included in the first medication instruction sentence data (step S45). Acquisition of the aforementioned comparison condition data is carried out on each medication instruction sentence data acquired one by one in step S53, which will be described later.

Then, the first decision classification/item data included in the patient data is acquired (step S48) . Once the first decision classification/item data included in the patient data has been acquired, it is decided whether or not this decision classification/item code of the patient data coincides with the decision classification/item code of the corresponding medication instruction sentence of the drug data (step S50). As a result of this comparison, if it does not coincide, the next decision classification/item code included in the patient code is acquired in succession (step S51), and this process is repeated until all the decision classification/item codes are acquired (step S49). Over these processes, if none of the decision classification/item codes coincide with the decision classification/item codes of the corresponding medication instruction sentences, then the next comparison condition data is acquired (step S54), and the program returns to the step S47, where a similar process is repeated.

Meanwhile, if the decision classification/item code results in a coincidence in step S50, it is decided whether or not the comparison condition is satisfied (step S52). As for the comparison condition, in the case of "=", for example, if the decision classification/item code of the patient data coincides with the decision classification/item code of the medication instruction sentence, the comparison result is a consistency of the comparison condition; if not, the result is an inconsistency.

If the comparison condition results in an inconsistency, the next comparison condition data is acquired in the same way as above (step S54), and the program returns to step S47, where a similar process is repeated. On the other hand, if the comparison condition results in a consistency, then it is further decided whether or not the logical continuation condition is "AND"(step S53). If the logical continuation condition is "AND", then the next comparison condition is acquired in the same way as above (step S54), and the program returns to step S47, where a similar process is repeated. On the other hand, if the logical continuation condition is not "AND", then the medication instruction sentence is selected since the comparison condition has already been consistent (step S55). Then, the next medication instruction sentence data is acquired (step S56), and the program returns to step S45, where a similar process is repeated.

In this way, when the above processes on all the medication instruction sentence data included in the first drug data have been completed, it is decided whether or not at least one of the medication instruction sentences on the efficiency/effect has been selected (step S57). If it has not been selected, the default medication instruction sentence is selected (step S58); if it has, the next drug code in the prescription data is acquired (step S59). Then the program returns to step S43, where the medication instruction sentence selection control is completed when the above process is completed on all the drug codes included in the prescription data.

More concretely, the operation is described below in a case where "Taro Yuyama" as a patient code, and "diuretics" and "antibiotics" as drug codes are included in input prescription data.

First, based on the patient code, a decision classification/item code pertinent to "Taro Yuyama" is acquired from the patient data in Table 4. The acquired decision classification/item code includes only the nationality/language area of being Japan and the sex of being female. On the other hand, based on the drug code, the medication instruction sentence data concerning "diuretics" is first acquired from the medication instruction sentence master of Table 3. Then, it is decided whether or not a medication instruction sentence corresponding to the decision classification/item code of the patient data is included in the acquired medication instruction sentence data, in steps of each medication instruction sentence. As for the aforementioned "Taro Yuyama", since there is no corresponding medication instruction sentence having the decision classification code/decision item code, it is decided as default so that "This drug excretes urine and remits swelling" is selected. Similarly, a medication instruction sentence is selected also for "antibiotics". Since there is no medication instruction sentence corresponding to the efficacy/effect having the decision classification/item data "antibiotics", it is decided as default in all cases so that "This drug kills microorganisms" is selected. After the corresponding medication instruction sentence is selected in this way, the data is printed on a caution sheet by the printer. The printed result is shown in FIG. 18.

Also, in the case where "Hanako Yamada" as patient data and "diuretics" and "antibiotics" as drug data are included in input prescription data, the selection of medication instruction sentences is carried out in the same way. In this case, as to "diuretics", a medication instruction sentence that satisfies the code all the decision classification/item code of "This drug excretes urine and decreases blood pressure" is included in the patient data of "Hanako yamada", so that this medication instruction sentence is selected. On the other hand, as to "antibiotics", the medication instruction sentence, "This drug kills microorganisms" is selected for the same reason as described above. Moreover, since a medication instruction sentence that satisfies all the decision classification codes/decision item codes of the medication instruction sentence, "Inform the doctor in charge if you are in pregnancy (or breast-feeding), or have a possibility of pregnancy" is included in the patient code of "Hanako Yamada", this medication instruction sentence is also selected. The data is printed on the caution sheet based on this result. The printed result is shown in FIG. 19.

Furthermore, also in the case where "Kazuo Kawabata" as patient data and "diuretics" and "antibiotics" as drug data are included in the prescription data, the selection of medication instruction sentences is carried out in the same manner as described above. The selection result is as shown in FIG. 20.

In addition, when the nationality and language area is any other than Japan, it is appropriate to prepare translations in the pertinent language beforehand, or to incorporate machine translation.

What is claimed is:

1. A printing apparatus for printing on medicine bags, said apparatus comprising:

storage means for storing print data concerning drugs in correspondence to individual patient data in units of drug identification data corresponding to respective drugs;

reading means for reading pertinent print data from said storage means based on drug identification data included in prescription data for individual patients;

print data selecting means for selecting print data corresponding to an individual patient based on the patient data included in the prescription data from the print data read by said reading means; and printing means for printing the print data selected by said print data selection means.

2. A printing apparatus according to claim 1, wherein said print data stored by said storage means comprises:

patient data composed of patient codes for individual patients and decision classification codes/decision item codes associated with the individual patient codes; and drug data composed of a drug code attached to each drug, decision classification codes/decision item codes correlated to the individual drug codes, and medication instruction sentences correlated to respective decision classification codes/decision item codes;

and wherein said reading means, based on a patient code and a drug code included in prescription data, reads corresponding patient data and drug data from the storage means;

and wherein the print data selecting means is operable to, based on a decision classification code and a decision item code included in the patient data read by said reading means, select a corresponding medication instruction sentence from the drug data read by said reading means.

3. A printing apparatus according to claim 2, wherein said storage means stores therein as print data a medication instruction sentence which does not correspond to the decision classification codes/decision item codes, and said print data selecting means is operable to select the medication instruction sentence when the drug code read by said reading means has no coincident decision classification code/decision item code included in the respective patient code.

* * * * *